United States Patent
Donovan et al.

(10) Patent No.: US 9,147,264 B2
(45) Date of Patent: Sep. 29, 2015

(54) METHOD AND SYSTEM FOR QUANTIZING AND SQUEEZING BASE VALUES OF ASSOCIATED TILES IN AN IMAGE

(75) Inventors: Walter E. Donovan, Saratoga, CA (US); Tyson J. Bergland, Palo Alto, CA (US)

(73) Assignee: NVIDIA CORPORATION, Santa Clara, CA (US)

(*) Notice: Subject to any disclaimer, the term of this patent is extended or adjusted under 35 U.S.C. 154(b) by 7 days.

(21) Appl. No.: 13/403,910

(22) Filed: Feb. 23, 2012

(65) Prior Publication Data
US 2012/0213435 A1 Aug. 23, 2012

Related U.S. Application Data

(60) Provisional application No. 61/445,982, filed on Feb. 23, 2011, provisional application No. 61/446,937, filed on Feb. 25, 2011.

(51) Int. Cl.
| | |
|---|---|
| *G06K 9/36* | (2006.01) |
| *G06T 9/00* | (2006.01) |
| *H04N 19/70* | (2014.01) |
| *H04N 19/593* | (2014.01) |
| *H04N 19/90* | (2014.01) |

(52) U.S. Cl.
CPC .......... *G06T 9/004* (2013.01); *H04N 19/00763* (2014.11); *H04N 19/00884* (2014.11); *H04N 19/00945* (2014.11)

(58) Field of Classification Search
None
See application file for complete search history.

(56) References Cited

U.S. PATENT DOCUMENTS

| | | | |
|---|---|---|---|
| 5,734,744 A | 3/1998 | Wittenstein et al. | |
| 5,790,705 A * | 8/1998 | Anderson et al. | 382/244 |
| 6,026,180 A | 2/2000 | Wittenstein et al. | |
| 6,181,822 B1 * | 1/2001 | Miller et al. | 382/232 |
| 6,356,588 B1 * | 3/2002 | Otto | 375/240.03 |
| 6,518,974 B2 | 2/2003 | Taylor et al. | |
| 7,039,241 B1 | 5/2006 | Van Hook | |
| 7,308,146 B2 * | 12/2007 | Becker et al. | 382/233 |
| 7,565,028 B2 | 7/2009 | Saed | |
| 8,111,928 B2 | 2/2012 | Van Hook et al. | |
| 8,411,942 B2 | 4/2013 | Chen et al. | |
| 8,942,474 B2 | 1/2015 | Werness et al. | |
| 2002/0061063 A1 * | 5/2002 | Otto | 375/240.03 |
| 2004/0105015 A1 | 6/2004 | Tsukioka | |
| 2005/0152610 A1 * | 7/2005 | Hagiwara et al. | 382/239 |
| 2006/0215923 A1 * | 9/2006 | Beatty | 382/253 |
| 2011/0170609 A1 * | 7/2011 | Lainema et al. | 375/240.24 |
| 2011/0194616 A1 * | 8/2011 | He et al. | 375/240.24 |
| 2011/0242113 A1 | 10/2011 | Keall et al. | |
| 2012/0050563 A1 | 3/2012 | Cote et al. | |
| 2012/0121013 A1 * | 5/2012 | Lainema et al. | 375/240.12 |
| 2012/0213435 A1 | 8/2012 | Donovan et al. | |
| 2014/0009576 A1 | 1/2014 | Hadzic et al. | |
| 2014/0184632 A1 | 7/2014 | Donovan | |

* cited by examiner

*Primary Examiner* — Tsung-Yin Tsai

(57) ABSTRACT

A method for performing image rendering. The method includes identifying a tile in an image, wherein the image comprises a plurality of tiles including color data that is displayed by a plurality of pixels. A quantized first base value and a quantized second base value are accessed from a block of memory, wherein the block is associated with the tile. Reverse quantization is performed on the quantized first and second base values to obtain a reproduced first base value, and a reproduced second base value corresponding to the tile for purposes of determining color values for corresponding pixels.

12 Claims, 23 Drawing Sheets

300

| | 1-bit | 2-bit | 4-bit |
|---|---|---|---|
| RGB | clamp / wrap | clamp / wrap | clamp / wrap |
| RGBA | clamp / wrap | clamp / wrap | clamp / wrap |

FIGURE 3

400A 4-bits decompresses to 8x8 texels

400B 2-bits decompresses to 4x8 texels

400C 1-bit decompresses to 8x8 texels

400D

| 63 | 62 | 61 | 60 | 59 | 58 | 57 | 56 | 55 | 54 | 53 | 52 | 51 | 50 | 49 | 48 | 47 | 46 | 45 | 44 | 43 | 42 | 41 | 40 | 39 | 38 | 37 | 36 | 35 | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| byte 7 | | | | | | | | 6 | | | | | | | | 5 | | | | | | | | 4 | | | | | | | | 3 | | | | | | | | 2 | | | | | | | | 1 | | | | | | | | byte 0 | | | | | | | |

Bit ordering in 64-bit block

| RGB | | | RGBA | | |
|---|---|---|---|---|---|
| 1b | 0:0 | Index control | 1b | 0:0 | Index control |
| 1b | 1:1 | Quantization control | 3b | 3:1 | Quantization control |
| 30b | 31:2 | Compressed quantized data | 28b | 31:4 | Compressed quantized data |
| 32b | 63:32 | Compressed indices | 32b | 63:32 | Compressed indices |

FIGURE 4E

RGB Quantization control

| ctl | Q0 | Q1 | Q0 details | Q1 details | Squeezed? |
|---|---|---|---|---|---|
| 0 | 15b | 15b | 554.1 | 554.1 | No |
| 1 | 18b | 12b | 665.1 | 443.1 | Yes |

Quantized data and control bits ordering-RGB

| bit # | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| q ctl 0 | Q1lsb | | Q1ch2(5:0) | | | Q1ch1(4:0) | | | | | Q1ch0(4:0) | | | | Q0lsb | | Q0ch1(3:0) | | | | Q0ch0(4:0) | | | | | | | | | | Qctl | lctl |
| q ctl 1 | Q1lsb | | | Q1ch2(4:0) | | | Q1ch1(5:0) | | | | | Q1ch0(4:0) | | | | Q0lsb | Q0ch1(4:0) | | | | | Q0ch2(2:0) | | | Q0ch1(3:0) | | | Q0ch0(3:0) | | | | Qctl | lctl |

| RGBA Quantization control | | | | Squeezed? |
|---|---|---|---|---|
| ctl | Q0 | Q1 | Q0 details | Q1 details | Squeezed? |
| 000 | 14b | 14b | 454.1 | 454.1 | no |
| 001 | 14b | 14b | 454.1 | 343.13 | no |
| 010 | 14b | 14b | 343.13 | 454.1 | no |
| 011 | 14b | 14b | 343.13 | 343.13 | no |
| 100 | 17b | 11b | 565.1 | 343.1 | yes |
| 101 | 15b | 13b | 554.1 | 332.14 | yes |
| 110 | 19b | 9b | 554.14 | 332.1 | yes |
| 111 | 18b | 10b | 454.14 | 232.12 | yes |

4001
Quantized data and control bits ordering-RGBA

| bit # | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| q ctl 000 | Q1sb | Q1ch2(3:0) | | | | Q1ch1(4:0) | | | | | Q1ch0(3:0) | | | | Q0sb | Q0ch2(3:0) | | | | Q0ch1(4:0) | | | | | Q0ch0(3:0) | | | | Qctl(2:0) | | | Qctl |
| q ctl 001 | Q1sb | Q1ch3(2:0) | | | Q1ch2(2:0) | | | Q1ch1(3:0) | | | | Q1ch0(2:0) | | | Q0sb | Q0ch2(3:0) | | | | Q0ch1(4:0) | | | | | Q0ch0(3:0) | | | | Qctl(2:0) | | | Qctl |
| q ctl 010 | Q1sb | Q1ch3(2:0) | | | Q1ch2(2:0) | | | Q1ch1(4:0) | | | | | Q1ch0(3:0) | | Q0sb | Q0ch3(2:0) | | | Q0ch2(2:0) | | | Q0ch1(3:0) | | | | Q0ch0(2:0) | | | Qctl(2:0) | | | Qctl |
| q ctl 011 | Q1sb | Q1ch3(2:0) | | | Q1ch2(2:0) | | | Q1ch1(3:0) | | | | Q1ch0(2:0) | | | Q0sb | Q0ch3(2:0) | | | Q0ch2(2:0) | | | Q0ch1(3:0) | | | | Q0ch0(2:0) | | | Qctl(2:0) | | | Qctl |
| q ctl 100 | Q1sb | Q1ch2(2:0) | | | Q1ch1(3:0) | | | | Q1ch0(2:0) | | | | Q0sb | Q0ch2(4:0) | | | | | Q0ch1(5:0) | | | | | | Q0ch0(4:0) | | | | | Qctl(2:0) | | Qctl |
| q ctl 101 | Q1sb | Q1ch3(1:0) | | Q1ch2(2:0) | | | Q1ch1(2:0) | | | Q1ch0(1:0) | | Q0sb | Q0ch3(3:0) | | | | Q0ch2(4:0) | | | | | Q0ch1(4:0) | | | | | Q0ch0(3:0) | | | Qctl(2:0) | | | Qctl |
| q ctl 110 | Q1sb | Q1ch2(2:0) | | | Q1ch1(2:0) | | | Q1ch0(2:0) | | | Q0sb | Q0ch3(3:0) | | | | Q0ch2(4:0) | | | | | Q0ch1(4:0) | | | | | Q0ch0(3:0) | | | | Qctl(2:0) | | | Qctl |
| q ctl 111 | Q1sb | Q1ch3(1:0) | | Q1ch2(2:0) | | | Q1ch1(2:0) | | | Q1ch0(1:0) | | Q0sb | Q0ch3(3:0) | | | | Q0ch2(3:0) | | | | Q0ch1(4:0) | | | | | Q0ch0(3:0) | | | | Qctl(2:0) | | | Qctl |

FIGURE 5C

Index Control

500C

| 1-bit | | 2-bit | | 4-bit | |
|---|---|---|---|---|---|
| Ctl | Index mode | Ctl | Index mode | Ctl | 4-bit note |
| 0 | 2/4 | 0 | 2/2 | 0 | transparent alpha disabled |
| 1 | 1/2 | 1 | 1/1 | 1 | transparent alpha enabled |

FIGURE 5D

Index bit ordering - 1bpp

500D

| bit position | 63 | 62 | 61 | 60 | 59 | 58 | 57 | 56 | 55 | 54 | 53 | 52 | 51 | 50 | 49 | 48 | 47 | 46 | 45 | 44 | 43 | 42 | 41 | 40 | 39 | 38 | 37 | 36 | 35 | 34 | 33 | 32 |
|---|---|---|---|---|---|---|---|---|---|---|---|---|---|---|---|---|---|---|---|---|---|---|---|---|---|---|---|---|---|---|---|---|
| Index ctl 0 | 166 | 164 | 162 | 160 | 146 | 144 | 142 | 140 | 126 | 124 | 122 | 120 | 106 | 104 | 102 | 100 |
| Index ctl 1 | 177 | 175 | 173 | 171 | 166 | 164 | 162 | 160 | 157 | 155 | 153 | 151 | 146 | 144 | 142 | 140 | 137 | 135 | 133 | 131 | 126 | 124 | 122 | 120 | 117 | 115 | 113 | 111 | 106 | 104 | 102 | 100 |

500E

Index bit ordering-2bpp

| bit position | 63 | 62 | 61 | 60 | 59 | 58 | 57 | 56 | 55 | 54 | 53 | 52 | 51 | 50 | 49 | 48 | 47 | 46 | 45 | 44 | 43 | 42 | 41 | 40 | 39 | 38 | 37 | 36 | 35 | 34 | 33 | 32 |
|---|---|---|---|---|---|---|---|---|---|---|---|---|---|---|---|---|---|---|---|---|---|---|---|---|---|---|---|---|---|---|---|---|
| Index ctl 0 | 137 | | 135 | | 133 | | 131 | | 126 | | 124 | | 122 | | 120 | | 117 | | 115 | | 113 | | 111 | | 106 | | 104 | | 102 | | 100 | |
| Index ctl 1 | 137 | 136 | 135 | 134 | 133 | 132 | 131 | 130 | 127 | 126 | 125 | 124 | 123 | 122 | 121 | 120 | 117 | 116 | 115 | 114 | 113 | 112 | 111 | 110 | 107 | 106 | 105 | 104 | 103 | 102 | 101 | 100 |

Index bit ordering-4bpp

| bit position | 63 | 62 | 61 | 60 | 59 | 58 | 57 | 56 | 55 | 54 | 53 | 52 | 51 | 50 | 49 | 48 | 47 | 46 | 45 | 44 | 43 | 42 | 41 | 40 | 39 | 38 | 37 | 36 | 35 | 34 | 33 | 32 |
|---|---|---|---|---|---|---|---|---|---|---|---|---|---|---|---|---|---|---|---|---|---|---|---|---|---|---|---|---|---|---|---|---|
| Index ctl 0 | 133 | | 132 | | 131 | | 130 | | 123 | | 122 | | 121 | | 120 | | 113 | | 112 | | 111 | | 110 | | 103 | | 102 | | 101 | | 100 | |
| Index ctl 1 | 133 | | 132 | | 131 | | 130 | | 123 | | 122 | | 121 | | 120 | | 113 | | 112 | | 111 | | 110 | | 103 | | 102 | | 101 | | 100 | |

```
// Inverse quantize q0, q1 to 8 bits and base, delta form
static void uq_ch02_generic (b001 squeezed,
            int q0, int q0prec, int q01sbprec,
            int q1, int q1prec, int q11sbprec, int 1sb0, int 1sb1, float & base. Float &delta)
{
    assert (q0prec >= 1 && q0prec <= 7 && q1prec >= 1 && q1prec <=7);
    assert (q01sbprec >= 0 && q01sbprec <= 1);
    assert (q11sbprec >= 0 && q11sbprec <= 1);
    assert (q0 >= 0 && q0 < (1 << q0prec) && q1 >= 0 && q1 < (1 << q1prec));
    if (squeezed) assert (q0prec > q1prec);

int uq0, uq1;

if (squeezed)                              // if squeezed, use the wider precision for both q's
        q1prec = q0prec;

q1 = q1 +q0;
    q1 &= (1<<q1prec) - 1;                     // mask off to q1's actual precision if (q01sbprec > 0)
        q0 = (q0 << q01sbprec)   1sb0;
    if (q11sbprec > 0)
        q1 = (q1 << q11sbprec)   1sb1;

int nq0 = 1 << (q0prec+q01sbprec);
    int nq1 = 1 << (q1prec+q11sbprec);

// bit-replicate scaling
    uq0 = (255 = q0 + (nq0-1)/2) / (nq0-1);
    uq1 = (255 = q1 + (nq1-1)/2) / (nq1-1);

assert (uq0 >= 0 && uq0 <= 255 && uq1 >= 0 && uq1 <= 255);

base = uq0;
    delta - uq1 = uq0;
}

// Inverse quantize q0, q1 to 4 bits (0..16 actually) and to base, delta form
static void uq_ch3_generic(bool squeezed, int q0, int q0prec, int q1, int q1prec, float &base, float &delta)
{
    if (squeezed)
    {
        assert (q0prec >= 1 && q0prec <= 7 && q1prec >= 0 && q1prec <= 7);
        assert (q0prec > q1prec);
    }
    else
        assert (q0prec >= 0 && q0prec <= 7 && q1prec >= 0 && q1prec <= 7);
    assert (q0 >= 0 && q0 < (1 << q0prec) && q1 >= 0 && q1 < (1 << q1prec));

int uq0, uq1;
    if (sqeezed)                               // If squeezed, use the wider precision for both q's
        q1prec = q0prec;

q1 = q1 + q0;
    q1 &= (1<<q1prec) - 1;                     // mask off to q1's actual precision // note this is not a bit replicate scaling
    uq0 = (q0prec ==0) ? 16 : (q0 << (4 - q0prec));
    uq1 = (q1prec ==0) ? 16 : (q1 << (4 - q1prec));

assert (uq0 >= 0 && uq0 <= 16 && uq1 >= 0 && uq1 <= 16);

base = uq0;
    delta = uq1-uq0;
}
```

FIGURE 19

METHOD AND SYSTEM FOR QUANTIZING AND SQUEEZING BASE VALUES OF ASSOCIATED TILES IN AN IMAGE

CROSS REFERENCE TO RELATED APPLICATIONS

This application claims priority to and the benefit of U.S. Provisional Application No. 61/445,982, entitled "ZIL 2 AND 4 BITS/PIXEL FIXED BLOCK SIZE RGB AND RGBA COMPRESSION FORMAT," with filing date 23 Feb. 2011, which is herein incorporated by reference in its entirety. This application also claims priority to and the benefit of U.S. Provisional Application No. 61/446,937, entitled "ZIL 1, 2, AND 4 BITS/PIXEL FIXED BLOCK SIZE RGB AND RGBA COMPRESSION FORMAT," with filing date 25 Feb. 2011, which is herein incorporated by reference in its entirety. This application is related to U.S. application Ser. No. 11/403,908, entitled "METHOD AND SYSTEM FOR INTERPOLATING BASE AND DELTA VALUES OF ASSOCIATED TILES IN AN IMAGE,", concurrently filed with the present application with filing date 23 Feb. 2012, which is herein incorporated by reference in its entirety

BACKGROUND

An image includes color information that is displayed on a two-dimensional array of pixels. The pixels are divided into tiles of the image. Color and/or texture information related to the pixels within a tile are stored in a block of memory. The image can be encoded (compressed) to reduce its size so that the image can be efficiently stored in memory. The stored information is then accessed, where it can be decoded (de-compressed), reconstructed, and displayed.

An image's true color is typically rendered as 32 bits per pixel, wherein eight bits are assigned to each of the red, green, blue, and alpha (transparency) components. However, the cost of storing true color information for each of the pixels in an image is prohibitively high. In part, to keep the cost and required space reasonable, the memory included in image rendering systems is designed to store a finite amount of information that is smaller than the amount associated with the true information related to one or more images.

Additionally, the bandwidth required for rendering images is of concern. Transferring true color information (e.g., 32 bits for each pixel) for pixels in an image would require large amounts of bandwidth between the memory and the image renderer. For real-time images and videos, this bandwidth requirement is impossible to meet without increasing circuit layouts thereby increasing the size and cost of the image renderer.

One solution to the limited memory and bandwidth requirements is to compress and/or encode the true color information for an image, and to store the compressed data within memory. Thereafter, the compressed data is decoded (decompressed), reconstructed, and displayed. Proper implementation of compression and decompression methods is desired for lossless storage and display of images.

SUMMARY

A method for performing image decompression is disclosed. The method includes identifying a pixel in an image, wherein the image comprises a plurality of tiles including color data that is displayed by a plurality of pixels, wherein each tile is associated with a base value, a delta value, and a plurality of indices. One or more tiles associated with the pixel are identified. An interpolated base is determined by interpolating bases of the one or more tiles. An interpolated delta is determined by interpolating deltas of the one or more tiles. An index is determined for the pixel. A color value is determined for the pixel based on the interpolated base, interpolated delta, and the index.

In some embodiments, a system includes a tangible, non-transitory computer-readable storage medium having stored thereon, computer-executable instructions that, when executed causes the computer system to perform a method for performing image decompression. The method includes identifying a pixel in an image, wherein the image comprises a plurality of tiles including color data that is displayed by a plurality of pixels, wherein each tile is associated with a base value, a delta value, and a plurality of indices. One or more tiles associated with the pixel are identified. An interpolated base is determined by interpolating bases of the one or more tiles. An interpolated delta is determined by interpolating deltas of the one or more tiles. An index is determined for the pixel. A color value is determined for the pixel based on the interpolated base, interpolated delta, and the index.

In other embodiments, a codec is configured to perform a method for performing image decompression. The method includes identifying a pixel in an image, wherein the image comprises a plurality of tiles including color data that is displayed by a plurality of pixels, wherein each tile is associated with a base value, a delta value, and a plurality of indices. One or more tiles associated with the pixel are identified. An interpolated base is determined by interpolating bases of the one or more tiles. An interpolated delta is determined by interpolating deltas of the one or more tiles. An index is determined for the pixel. A color value is determined for the pixel based on the interpolated base, interpolated delta, and the index.

In some embodiments, a computer-readable medium having computer-executable instructions stored thereon for performing a method of image decompression is disclosed. The method includes identifying a pixel in an image, wherein the image comprises a plurality of tiles including color data that is displayed by a plurality of pixels, wherein each tile is associated with a base value, a delta value, and a plurality of indices. A group of pixels is determined, wherein the group surrounds the pixel. One or more valid indices are determined for the group of pixels. An index is determined for the pixel based on the one or more valid indices.

Further, another method for image rendering to include quantization is implemented within a codec. The method includes identifying a tile in an image, wherein the image comprises a plurality of tiles including color data that is displayed by a plurality of pixels. A first base value is determined that is associated with the tile. A second base value is determined that is associated with the tile. The first and second base values are quantized to obtain a quantized first base value and a quantized second base value. Delta encoding is performed on the quantized second base value in relation to the quantized first base value to obtain a squeezed, quantized second base value. The quantized first base value and the squeezed, quantized second base value are stored in a block of memory for purposes of color rendering for pixels in the tile.

In other embodiments, a computer-readable medium having computer-executable instructions stored thereon for performing a method of image rendering is disclosed. The method includes identifying a tile in an image, wherein the image comprises a plurality of tiles including color data that is displayed by a plurality of pixels. A first base value is determined that is associated with the tile. A second base value is determined that is associated with the tile. The first and second base values are quantized to obtain a quantized first base value and a quantized second base value. Delta encoding is performed on the quantized second base value in relation to the quantized first base value to obtain a squeezed, quantized second base value. The quantized first base value and the squeezed, quantized second base value are stored in a block of memory for purposes of color rendering for pixels in the tile.

In other embodiments, a computer-readable medium having computer-executable instructions stored thereon for performing another method of image rendering is disclosed. The method includes identifying a tile in an image, wherein the image comprises a plurality of tiles including color data that is displayed by a plurality of pixels. A quantized first base value and a quantized second base value are accessed from a block of memory associated with the tile. Reverse quantization is performed on the quantized first base value and the quantized second base value to obtain a reproduced base value and a reproduced second base value. A delta value is determined based on the difference between the reproduced first and second base values, wherein the reproduced first base value and the delta value are used for purposes of determining color values for corresponding pixels in the corresponding tile.

Thus, according to embodiments of the present disclosure base, delta, and index information is interpolated between one or more associated tiles to obtain color information for a pixel. Moreover, quantization and delta encoding of the base, delta, and index information are performed for purposes of compressing image data. Reverse quantization and reverse delta encoding are also performed for purposes of decompressing the image data.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

FIG. 3 is a table 300 illustrating the various bits per pixel formats supported by embodiments of the present invention.

FIG. 4D is an illustration of a block of memory used for storing color and/or texture information for a tile, in accordance with one embodiment of the present disclosure.

FIG. 4E is a table 400E illustrating quantized color values for both RGB and RGBA modes, in accordance with one embodiment of the present disclosure.

FIG. 4F is a table illustrating RGB color quantization values for the RGB mode, in accordance with one embodiment of the present disclosure.

FIG. 4G is an illustration of a bit layout illustrating the ordering of quantized data and control bits in the RGB mode, in accordance with one embodiment of the present disclosure.

FIG. 4H is a table illustrating RGBA color quantization values for the RGBA mode, in accordance with one embodiment of the present disclosure.

FIG. 4I is an illustration of a bit layout illustrating the ordering of quantized data and control bits in the RGBA mode, in accordance with one embodiment of the present disclosure.

FIG. 5C is a table illustrating index modes as indicated by the index control bits for a 1 bit, 2-bit, and 4-bit compression modes, in accordance with one embodiment of the present disclosure.

FIG. 5D-F are illustrations of bit layouts illustrating the ordering of the index bits for 1 bpp, 2 bpp, and 4 bpp modes in accordance with embodiments of the present disclosure.

FIG. 9 is an illustration of a tile showing the pixels used for determining an index value for a pixel in the tile, in accordance with one embodiment of the invention.

FIG. 10 is an illustration of a tile showing the pixels used for determining an index value for a pixel in the tile in the 2 bits for every 4 pixels (2/4) mode, in accordance with one embodiment of the invention.

FIG. 12 is a diagram showing possible combinations of 1/2 and 2/4 tiles (e.g., with a 1-index border) for a 1 bpp format, in accordance with one embodiment of the invention.

FIG. 14 is an illustration of a tile showing pixels and their relation to index values in the tile in the 1 bit for every 1 pixels (1/1) mode, in accordance with one embodiment of the invention.

FIG. 15 is an illustration of a tile showing the pixels used for determining an index value for a pixel ("+") in the tile in the 2 bits for every 4 pixels (2/4) mode, in accordance with one embodiment of the invention.

FIG. 19 is an illustration of the code used for implementing reverse quantization processes for determining reproduced base and delta values for a pixel, in accordance with one embodiment of the present disclosure.

DETAILED DESCRIPTION

Figure 1:
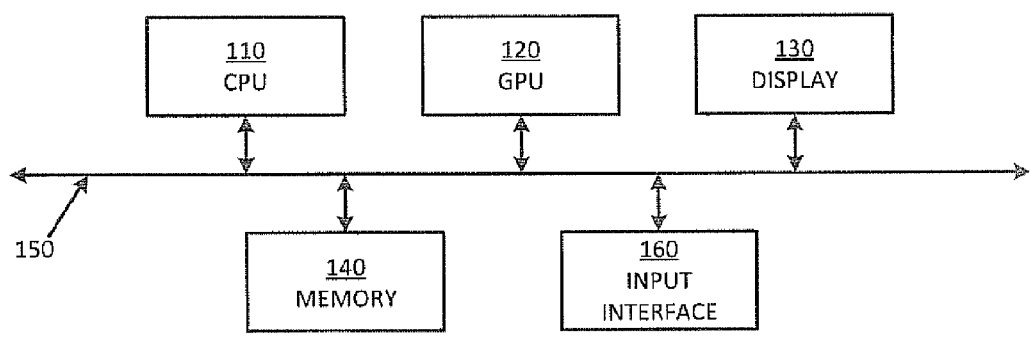
FIG. 1 depicts a block diagram of an exemplary computer system suitable for implementing the present methods in accordance with one embodiment of the present disclosure.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "identifying," "determining," "quantizing," "delta encoding," "storing," "accessing," or the like, refer to actions and processes (e.g., flowcharts 500A, 500B, 600, and 700 of FIGS. 5A-B, 6, and 7, respectively) of a computer system or similar electronic computing device or processor (e.g., system 100 of FIG. 1). The computer system or similar electronic computing device manipulates and transforms data represented as physical (electronic) quantities within the computer system memories, registers or other such information storage, transmission or display devices.

FIGS. 3A-B, 4, and 5 are flowcharts of examples of computer-implemented methods for processing data according to embodiments of the present invention. Although specific steps are disclosed in the flowcharts, such steps are exemplary. that is, embodiments of the present invention are well-suited to performing various other steps or variations of the steps recited in the flowcharts.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

In the discussion that follows, unless otherwise noted, a "codec" refers to an element (e.g., a stand-alone or peripheral device, or an integrated system) that performs both encoding and decoding. For instance, "coding," unless otherwise noted, refers to basic encoding operations (e.g., interpolation, quantization, delta encoding, least significant bit compression, etc.), while "decoding" refers to basic decoding operations (e.g., reverse quantization, delta decoding, least significant bit decompression, etc.). One or more "tiles" refers to an array of pixels (e.g., N×N array), wherein each tile is associated with a "block" of memory that stores information used for rendering color and/or textures of a pixel in the corresponding tile. The term "pixel" refers to a location in two-dimensional screen space.

In embodiments of the present disclosure, systems and methods are described in which compression and decompression of base, delta, and index values are performed to store and display color and/or texture information for a pixel in an image. Advantages of embodiments of the present invention include the decompression of pixel information that is performed in a wrapped or clamped mode for pixels at the borders of an image. Other advantages of embodiments of the present invention include compression and decompression of pixel and tile information that are performed for images of arbitrary size, and not just powers of two sizes. Still other advantages of embodiments of the present invention provide for LSB compression and decompression of base and delta values for a tile of an image.

FIG. 1 is a block diagram of an example of a computing system 100 capable of implementing embodiments of the present disclosure. Computing system 10 broadly represents any single or multi-processor computing device or system capable of executing computer-readable instructions. Examples of computing system 100 include, without limitation, workstations, laptops, client-side terminals, servers, distributed computing systems, handheld devices, or any other computing system or device. In its most basic configuration, computing system 100 may include at least one processor 110 and a system memory 140.

Both the central processing unit (CPU) 110 and the graphics processing unit (GPU) 120 are coupled to memory 140. System memory 140 generally represents any type or form of volatile or non-volatile storage device or medium capable of storing data and/or other computer-readable instructions. Examples of system memory 140 include, without limitation, RAM, ROM, flash memory, or any other suitable memory device. In the example of FIG. 1, memory 140 is a shared memory, whereby the memory stores instructions and data for both the CPU 110 and the GPU 120. Alternatively, there may be separate memories dedicated to the CPU 110 and the GPU 120, respectively. The memory can include a frame buffer for storing pixel data drives a display screen 130.

The system 100 includes a user interface 160 that, in one implementation, includes an on-screen cursor control device. The user interface may include a keyboard, a mouse, and/or a touch screen device (a touchpad).

CPU 110 and/or GPU 120 generally represent any type or form of processing unit capable of processing data or interpreting and executing instructions. In certain embodiments, processors 110 and/or 120 may receive instructions from a software application or hardware module. These instructions may cause processors 110 and/or 120 to perform the functions of one or more of the example embodiments described and/or illustrated herein. For example, processors 110 and/or 120 may perform and/or be a means for performing, either alone or in combination with other elements, one or more of the identifying, determining, quantizing, reverse quantization, delta encoding, and delta decoding, described herein. Processors 110 and/or 120 may also perform and/or be a means for performing any other steps, methods, or processes described and/or illustrated herein.

The computer-readable medium containing the computer program may be loaded into computing system 100. All or a portion of the computer program stored on the computer-readable medium may then be stored in system memory 140 and/or various portions of storage devices. When executed by processors 110 and/or 120, a computer program loaded into computing system 100 may cause processor 110 and/or 120 to perform and/or be a means for performing the functions of the example embodiments described and/or illustrated herein. Additionally or alternatively, the example embodiments described and/or illustrated herein may be implemented in firmware and/or hardware.

Figure 2:
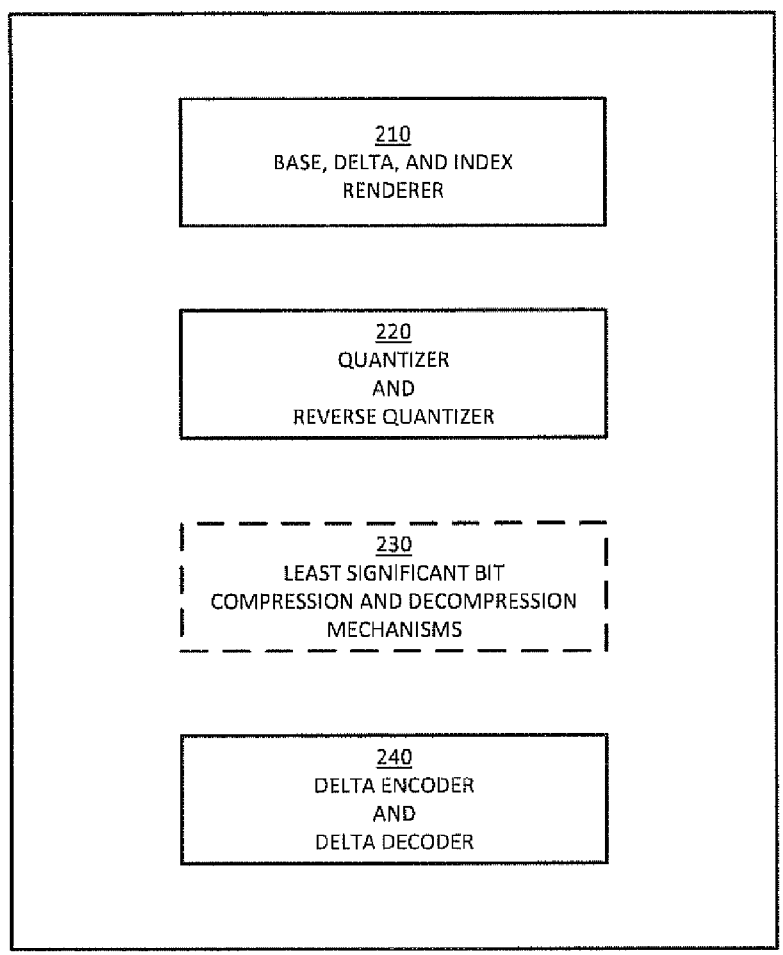
FIG. 2 is a block diagram of an image coder/decoder (codec) configured to render images, in accordance with one embodiment of the present disclosure.

FIG. 2 is a block diagram of an image coder/decoder (codec) 200 configured to render images, in accordance with one embodiment of the present disclosure. In general, the coder is configured to compress color and/or texture information for pixels of an image for storage. The decoder is configured to receive the compressed color and/or texture information, decode the information, and produce a displayable image.

In particular, the base, delta, and index renderer 210 is configured to interpolate and/or determine a base value, a delta value, and one or more indices for a tile of an image. For each pixel in a tile, a color value is determined based on the base and delta values that is weighted by an index value corresponding to the pixel. Additionally, the quantizer portion of 220 provides for quantization of the first and second base values and index values for one or more tiles of an image during compression. The reverse quantizer portion of 220 provides for reverse or reverse quantization of the compressed first and second base values and index values for one or more tiles of the image. In addition, mechanism 230 provides least significant bit (LSB) compression of the first and second base values for one or more tiles. Mechanism 230 also provides LSB decompression of the first and second base values for one or more tiles. Further, delta encoder/decoder 240 provides for delta encoding of the second base values during compression, and also provides for delta decoding of the second base value during decompression. The reverse quantizer 220 also determines a delta value based on the difference between the first and second base values that are decompressed. The base, delta, and index renderer 210, quantizer/reverse quantizer 220, LSB compression/decompression mechanism 230, and delta encoder/decoder 240 are configurable for compressing color and/or texture information associated with pixels of one or more tiles of an image, and is also configurable for decompressing the compressed color and/or texture information for pixels of tiles of an image for purposes of displaying the image.

Embodiments of the present invention provide for one or more fix-block size texture compression formats. For instance, 1, 2, and 4 bits/pixel (bpp) formats are supported for compressing red, green, and blue (RGB) and red, green, blue, and alpha (RGBA) images of uncompressed 8 bits per channel. At a high level, an image is decompressed by up-sampling base and delta image information, and then selecting, on a texel by texel basis, between the base and up to three delta offsets. For purposes of the present application, a texel provides color and texture information for a representative pixel on a display.

More particularly, a texture is defined by its dimensions, a set of format selectors, and blocks defining the texels based on the format selected. A compressed texture may be of any size. That is, textures are not limited to dimensions that are a power of two, in one embodiment. In another embodiment, textures are not limited to an integer multiple of the block size. Format selectors include "is_rgb" for determining an alpha mode, "bpp" for determining the bits per pixel mode, and "is_wrapped" for determining whether the mode is wrapped or clamped. In the RGB mode, "is_rgb=true" means that all of the pixels have a maximum alpha value (e.g., 255) when decompressed, in most cases.

FIG. 3 is a table 300 illustrating the various formats supported by embodiments of the present invention. As shown, for the RGB mode, for each of the 1 bpp, 2 bpp, and 4 bpp, there is a clamp mode and a wrap mode. In addition, in the RGBA mode, for each of the 1 bpp, 2 bpp, and 4 bpp, there is a clamp mode and a wrap mode.

In a wrap mode, "is_wrapped=true" indicates that tiles and/or associated blocks from opposite edges of the image are used when decompressing pixels of tiles on the image perimeter. That is, when providing texturing for a texel or pixel, the wrap mode is implemented. In a clamp mode, the above statement is false, and indicates that a tile of a pixel is repeated when decompressing pixels on the image perimeter. That, when providing texturing for a texel or pixel, the clamp mode is implemented.

Figure 4A:
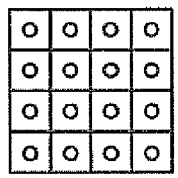
FIGS. 4A-C provide illustrations of 1 bpp, 2 bpp, and 4 bpp formats for providing delta, base, and index values for pixels in a tile, in accordance with one embodiment of the invention.
Figure 4B:
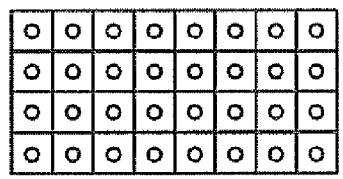
Figure 4C:
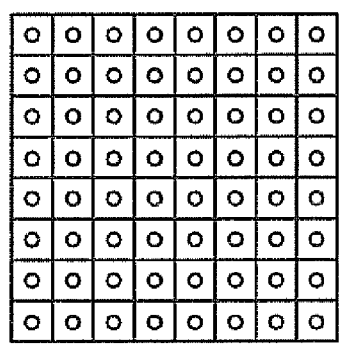

FIGS. 4A-C provide illustrations of 1 bpp, 2 bpp, and 4 bpp formats for providing delta, base, and index values for pixels in a tile, in accordance with one embodiment of the invention. More particularly, a corresponding block of a tile is configured as 64 bits. As such, FIG. 4A provides a 4×4 texel or pixel mapping 400A for a 4 bpp mode. That is, when storing information in the block of a corresponding tile, 4 bits/pixel are reserved for each pixel when storing color/texture information, since a block is 64 bits in size. In addition, FIG. 4B provides a 4×8 texel or pixel mapping 400B for a 2 bpp mode. That is, when storing information in the block of a corresponding tile, 2 bits/pixel can be reserved for each pixel when storing color/texture information, since the block is 64 bits in size. Also, FIG. 4C provides an 8×8 texel or pixel mapping 400C for a 1 bpp mode. That is, when storing information in the block of a corresponding tile, 1 bit/pixel can be reserved for each pixel when storing color/texture info for a block of 64 bits.

Each block of a corresponding tile includes an index control bit, one or more quantization control bits, compressed quantized data, and compressed indices. Half of the block is reserved for compressed indices, in one embodiment. The index control bit has different meanings in 1 bpp, 2 bpp and 4 bpp modes. For instance, in the 1 bpp mode, the index control bit determines whether the indices are compressed to 1 bit per 2 pixels (1/2) or 2 bits per 4 pixels (2/4). Also, in the 2 bpp mode, the index control bit determines whether the indices are compressed to 2 bits per 2 pixels (2/2), or 1 bit per pixel (1/1). Further, in the 4 bpp mode, the indices are always compressed to 2 bits per pixel (2/1). As such, in the 4 bpp mode, the control bit instead selects whether or not transparent alpha is enabled for that block.

For instance, FIG. 4D is an illustration of a block 400D of memory used for storing color and/or texture information for a tile, in accordance with one embodiment of the present disclosure. The block size is 64 bits (64b) and is 64 b aligned. Bit 0 of the block 400D is the least significant bit (LSB) of byte 0 of the block 400D, bit 7 of the block 400D is the most significant bit (MSB) of byte 0 of the block 400D. The outlined pattern continues until bit 63, which is the most significant bit of byte 7 of the block 400D.

In addition, there is one quantization control bit in RGB mode and 3 quantization control bits in RGBA mode (e.g., "is_rgb is false"). The compressed quantized data is stored in 30 bits in RGB mode, and 28 bits in RGBA mode. This data is stored in two fields, Q0 and Q1, which, when decompressed, give two base values, from which a delta value is determined. A first base value and the delta value are used for determining colors of pixels in a corresponding tile of an image. In one embodiment, the compression formats are based on a 64-bit block. The low-order bits (0-31) contain color values fed into the reverse quantization functions. The layout and allocation of low-order bits depends solely on whether the format is RGB or RGBA. The high order bits (32-63) contain compressed indices and depend solely on the compression ratio, 1-bit, 2-bit or 4-bit.

The layout of these two fields Q0 and Q1 is outlined in FIGS. 4E-G. For instance, FIG. 4E is a table 400E illustrating quantized color values for both RGB and RGBA modes, in accordance with one embodiment of the present disclosure. FIG. 4F is a table 400F illustrating RGB color quantization values for the RGB mode, in accordance with one embodiment of the present disclosure. FIG. 4G is an illustration of a bit layout 400G illustrating the ordering of quantized data and control bits in the RGB mode, in accordance with one embodiment of the present disclosure. FIG. 4H is a table 400H illustrating RGBA color quantization values for the RGBA mode, in accordance with one embodiment of the present disclosure. FIG. 4I is an illustration of a bit layout 400I illustrating the ordering of quantized data and control bits in the RGBA mode, in accordance with one embodiment of the present disclosure.

In general, to decompress a pixel, four blocks surrounding that pixel are selected to determine a decompressed index, four base values, and four delta values, wherein a first base value and a second base value in compressed form are stored per block. A delta value is determined based on the difference between the decompressed first and second base values, wherein the first base value and the delta value are used for interpolation. Specifically, the base and delta values from the blocks are bilinearly interpolated, with variable precision. The delta is added to the base in an amount proportional to the decompressed index for that pixel. Finally, the results are clamped from above to be less than or equal to 255, giving 8 bits per channel in red, green, blue, and alpha.

In one embodiment, if the texture width is 1, one block horizontally is used. Otherwise, MAX(2, (w+7)/8) blocks are used (for 1 bpp and 2 bpp) and MAX(2, (w+3)/4) blocks are used for 4 bpp. In another embodiment, if the texture height his 1, one block vertically is used. Otherwise, MAX(2, (h+7)/8) blocks are used (for 1 bpp) and MAX(2, (h+3)/4) blocks (for 2 bpp and 4 bpp.)

Figure 5A:
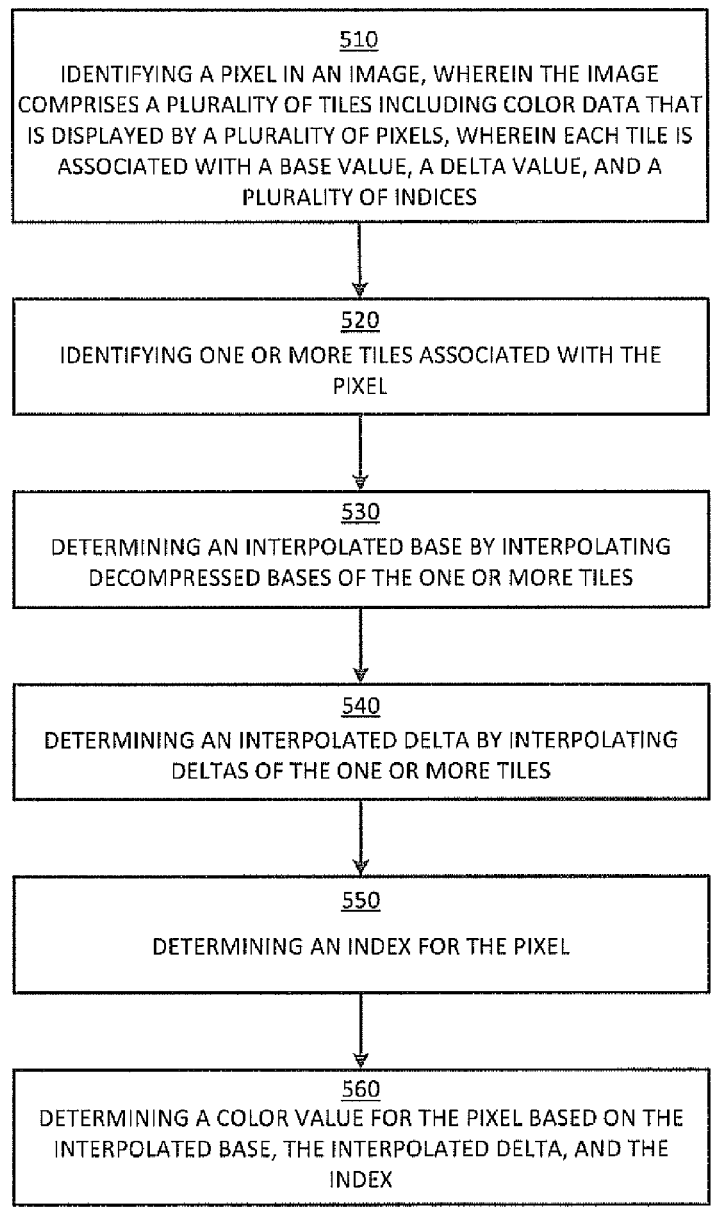
FIG. 5A is a flow diagram depicting a method for interpolating base, delta and index values for purposes of determining a color value for a pixel in an image, in accordance with one embodiment of the invention.

FIG. 5A is a flow diagram 500A depicting a computer implemented method for interpolating base, delta and index values for purposes of determining a color value for a pixel in an image, in accordance with one embodiment of the invention. More particularly, the operations performed by flow diagram 500A are implemented by the base, delta, and index renderer of codec 200 as illustrated in FIG. 2, in one embodiment.

At 510, a pixel is identified in an image. Information related to color and/or texture is determined based on compressed first and second base values, and index information for a tile that is associated the pixel. A delta value is determined based on the difference between the first and second base values, wherein the first base value and the delta value are used for determining color and/or texture information for a pixel in a corresponding tile. More particularly, the image comprises a plurality of tiles, each of which provides color and/or texture data that is displayable by a plurality of pixels for the image. Each tile is associated with a base value, a delta value, and a plurality of indices, wherein the indices provide weighting information for pixels in the tile.

At 520, for decompression purposes, one or more tiles are associated with the pixel, including the tile that contains the pixel. As will be further described below, up to four tiles are selected for purposes of determining color and texture information for that pixel. These four tiles include the tile that contains the pixel, as well as three adjacent or neighboring tiles. Each of the selected tiles is decompressed to determine a base value and a delta value. As previously described, a first base value and a second base value are compressed and stored for each block that corresponds to a tile. A delta value is determined after uncompressing the first and second base values, wherein the first base value and the delta value are used for determining color and/or texture information for a pixel. As such, four base values and four delta values are determined for each tile. Additionally, indices are decompressed for purposes of determining an index value for the pixel, as will be further described below.

For instance, a first tile is determined, wherein the first tile includes the pixel. An interior rectangle is also determined, wherein the interior rectangle comprises portions of the first tile and one or more adjoining tiles, wherein said interior rectangle is approximately the size of each of the plurality of tiles. As an example, the interior rectangle includes neighboring tiles that are to the right, bottom and bottom right of the tile containing the pixel.

In one embodiment, tiles are wrapped to obtain the four tiles associated with the interior rectangle. In another embodiment, tiles are clamped to obtain the four tiles associated with the interior rectangle.

At 530, an interpolated base is determined by interpolating the four base values associated with the four tiles. In one embodiment, the base values are the uncompressed first base values of each of the selected tiles. In one embodiment, bilinear interpolation is performed to determine the interpolated base value.

At 540, an interpolated delta value is determined by interpolating the four delta values associated with the four tiles. As previously described, for each tile, a delta value is determined from the uncompressed first and second base values that are stored in a corresponding block. For instance, the delta value is the difference between the first and second base values. In one embodiment, bilinear interpolation is performed to determine the interpolated delta value.

At 550, an index is determined for the pixel. The index value is determined by interpolating and/or averaging valid index values for neighboring pixels within the block of the tile containing the pixel, as will be further described in relation to FIG. 5B.

At 560, a color and/or texture value is determined for the pixels based on the interpolated base, the interpolated delta, and the index value for the pixel. In particular, the delta is added to the base value in an amount that is proportional to the decompressed index value for that pixel. In addition, the results are converted to 8 bits per channel for red, green, blue and alpha values for rendering color and/or texture for the pixel. In one embodiment, the color value is determined by Equation 1, as follows:

Pixel out=interpolated base+(interpolated delta*weighted index)  (1)

Figure 5B:
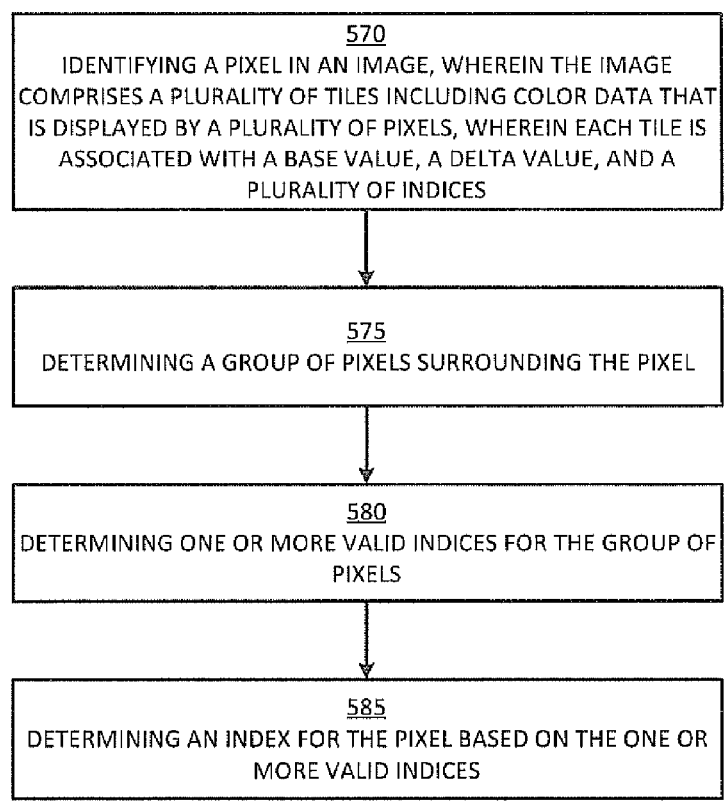
FIG. 5B is a flow diagram depicting a method for determining an index value for purposes of determining a color value for a pixel in an image, in accordance with one embodiment of the invention.

FIG. 5B is a flow diagram 500B depicting a method for determining an index value for purposes of determining a color value for a pixel in an image, in accordance with one embodiment of the invention. As shown, flow diagram 500B provides additional detail for determining an index value in 550 of diagram 500A of FIG. 5A. More particularly, the operations performed by flow diagram 500B are implemented by the base, delta, and index renderer of codec 200 as illustrated in FIG. 2, in one embodiment.

At 570, a pixel is identified in an image. Information related to color and/or texture is determined based on base, delta, and index information for a tile that is associated the pixel. More particularly, the image comprises a plurality of tiles, each of which provides color and/or texture data that is displayable by a plurality of pixels for the image. Each tile is associated with a base value, a delta value, and a plurality of indices, wherein the indices provide weighting information for pixels in the tile. As previously described, first and second base values are compressed stored for each tile in an image. When rendering an image, the first and second base values are uncompressed and a delta value is determined based on the first and second base values. The first base value and the delta value are used for determining color and/or texture information for a pixel in a corresponding tile.

At 575, a group of pixels is determined, wherein the group surrounds the pixel. In one embodiment, the pixels in the group are all associated with a single tile, such as the tile that contains the pixel of interest. In one embodiment, the group of pixels includes the nearest or adjacent neighbors of the pixel. For instance, FIG. 11 provides an illustration of a group of pixels 1100 including the eight nearest neighbors of pixels, such as the northwest, north, northeast, east, southeast, south, southwest, and west pixels surrounding pixel 1110, in accordance with one embodiment of the invention.

Figure 11:
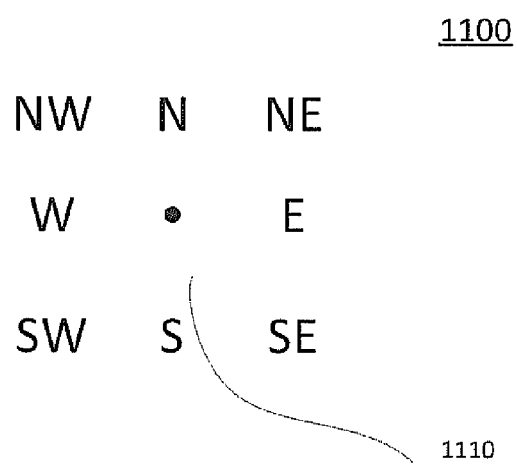
FIG. 11 is a diagram illustrating the eight nearest neighbors of pixels to a particular pixel for purposes of determining an index value for the pixel in a 1 bpp mode, in accordance with one embodiment of the invention.

In another embodiment, the group of pixels includes only the north, south, west, and east neighbors of pixels, as defined in FIG. 11. In still another embodiment, the group of pixels includes only the northeast, southeast, northwest, and southwest neighbors, as defined in FIG. 11.

At 580, one or more valid indices are determined for the group of pixels. At 585, an index value for the pixel is determined based on the one or more valid indices. In one embodiment, the valid indices are interpolated (e.g., bilinear interpolation) to determine the index for the pixel. In another embodiment, the indices are averaged, and then rounded to determine the index value for the pixel.

FIGS. 5C-F are illustrations of the formatting of the compressed indices in 1-bit, 2-bit, and 4-bit compression modes. For instance, FIG. 5C is a table 500C illustrating index modes as indicated by the index control bits for a 1 bit, 2-bit, and 4-bit compression modes, in accordance with one embodiment of the present disclosure. FIG. 5D is an illustration of a bit layout 500D illustrating the ordering of the index bits for a 1 bpp mode, in accordance with one embodiment of the present disclosure. FIG. 5E is an illustration of a bit layout 500E illustrating the ordering of the index bits for a 2 bpp mode, in accordance with one embodiment of the present disclosure. FIG. 5F is an illustration of a bit layout 500F illustrating the ordering of the index bits for a 4 bpp mode, in accordance with one embodiment of the present disclosure. In layouts of FIGS. 5D-F, bits 63 to 32 contain the compressed indices, stated in ivu form (e.g., i63 is the index at v=6, u=3).

Figure 6:
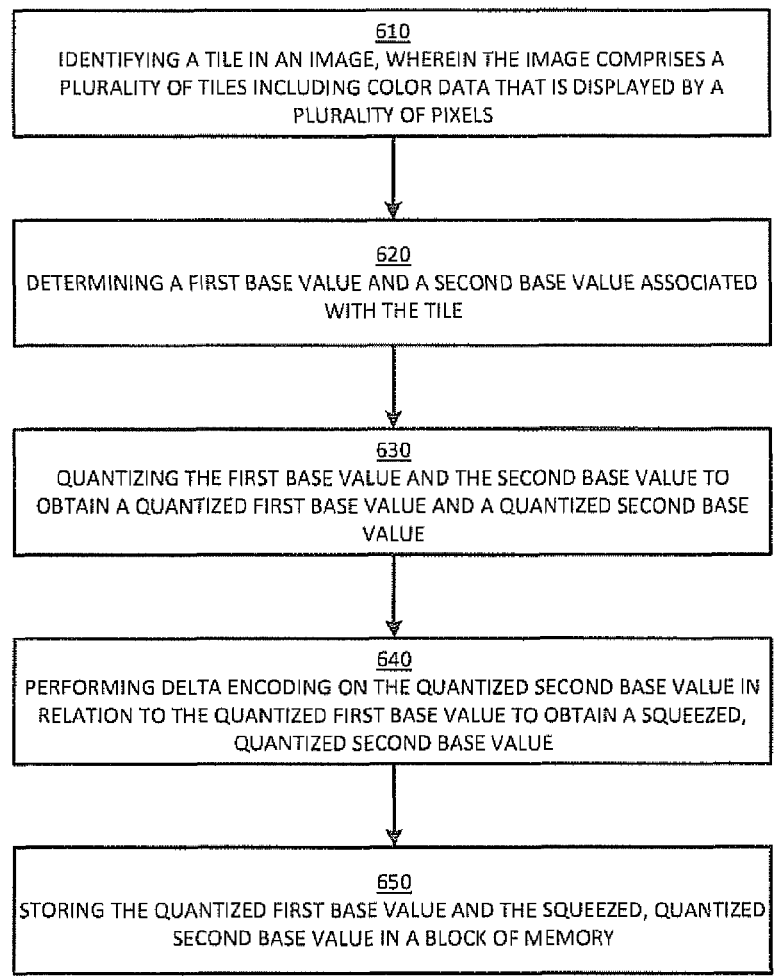
FIG. 6 is a flow diagram depicting a method for performing quantization and delta encoding when compressing base and delta values for a tile of an image, in accordance with one embodiment of the invention.
Figure 7:
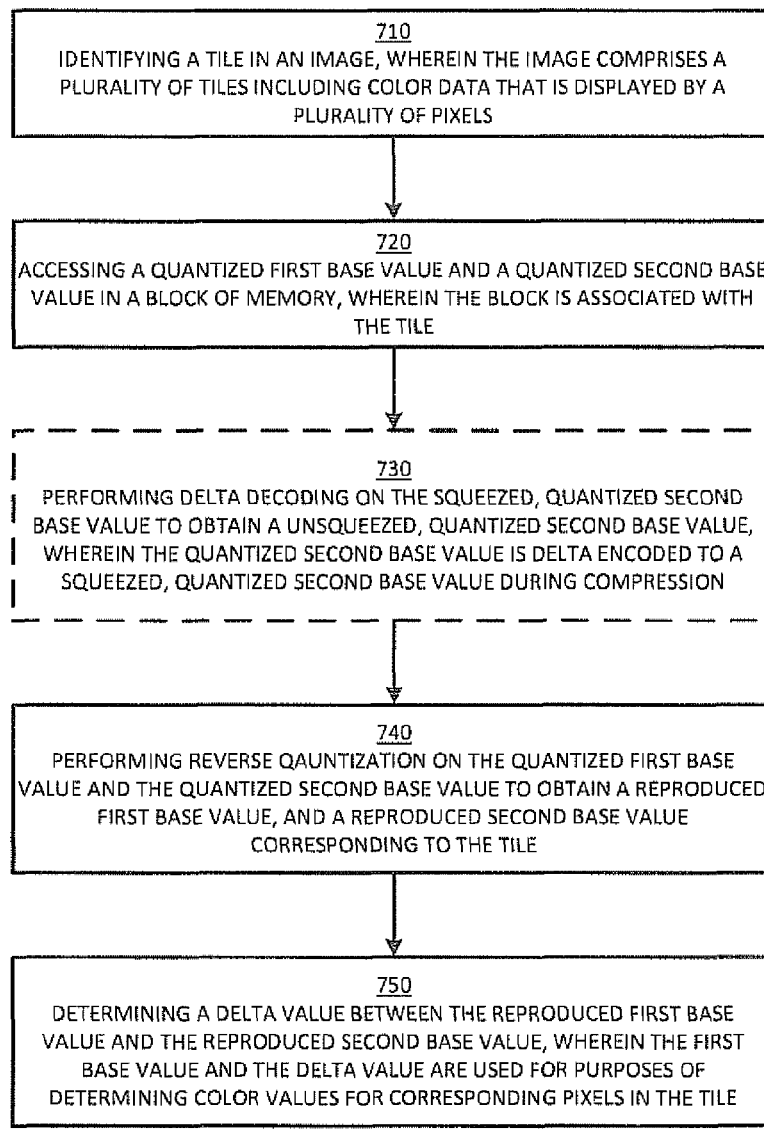
FIG. 7 is a flow diagram depicting a method for performing reverse quantization and reverse delta encoding when decompressing compressed base and delta values for a tile of an image, in accordance with one embodiment of the invention.

FIGS. 6 and 7 provide additional detail for compressing and decompressing base, delta, and index values for a tile in an image. More particularly, in embodiments, the operations performed in FIGS. 6 and 7 are performed by the modules of codec 200 of FIG. 2, including the quantizer/reverse quantizer 220, the LSB compression/decompression mechanism 230, and the delta encoder/decoder 230. In other embodiment, the methods of FIGS. 6 and 7 are implemented within a computer-readable medium having computer-executable instructions for performing methods of image rendering.

Specifically, FIG. 6 is a flow diagram depicting a method for performing quantization and delta encoding when compressing base and delta values for a tile of an image, in accordance with one embodiment of the invention. At 610, a tile is identified in an image, wherein the image comprises a plurality of tiles, each of which provides color and/or texture data is displayable by a plurality of pixels for the image.

Information related to color and/or texture is determined based on compressed base, delta, and index information for a tile that is associated the pixel. More particularly, the image comprises a plurality of tiles, each of which provides color and/or texture data that is displayable by a plurality of pixels for the image. Each tile is associated with a base value, a delta value, and a plurality of indices, wherein the indices provide weighting information for pixels in the tile.

In general, the color and/or texture information for pixels in a tile are compressed and stored in a 64 bit block. As such, true color and/or texture information is determined for the pixels in a tile. At 620, a first base value and a second base value is determined that is representative of the color and/or texture information for pixels in the corresponding tile. A delta value is determined from the first and second base values, as will be described more fully below. Base and delta values from neighboring blocks are interpolated to determine an interpolated base value and an interpolated delta value. The interpolated base value and interpolated delta value, when combined with a weighted index value gives color and/or texture information for each pixel in the tile.

At 630, quantization is performed to compress the first and second base values. In part, the first and second base values are quantized to obtain a quantized first base value and a quantized second base value, or representations thereof. Embodiments of the present invention are well suited to support one or more quantization methodologies.

In one embodiment, the alpha value is determined to be a constant, such as the maximum value of 255. For instance, alpha is determined to be a constant when the quantized value for alpha is at or near a maximum alpha value. As such, the delta, base, and index information for a tile may be stored in RGB mode, wherein the alpha value is a predetermined constant, and is not stored. Also, in some cases, alpha is not considered at all, and the color and/or texture information is stored in RGB mode. Also, in other cases, alpha is a constant value (e.g., other than the maximum 255), and may be a value that is inserted programmatically in a shader module. In this case, color and/or texture information is also stored in RGB mode. In another embodiment, the alpha value is not a constant, and takes on a value that is less than the quantized maximum alpha value. As such, the delta, base, and index information for a tile may be stored in RGBA mode.

At 640, delta encoding or squeezing is optionally performed on the quantized second base value in relation to the quantized first base value to provide further compression. As such, a squeezed, quantized second base value is determined. More particularly, the quantized second base value (or a representation thereof, such as Q1) is close to the quantized first base value (or a representation thereof, such as Q0). Because their values are close, a difference value obtained through delta encoding can be stored instead of the quantized second base value, wherein the difference is calculated between the quantized base value and the quantized delta value. Because the difference value can require fewer bits to store, the base value can be represented more accurately. Also, a bit is enabled to determine whether or not delta encoding was performed, in one embodiment.

At 650, the quantized first base value and the squeezed, quantized second base value are stored in a corresponding block. The block contains the color and/or texture information for the corresponding tile.

In another embodiment, LSB compression is performed for further compression. In particular, LSB compression is performed on the quantized first base value, or a representation thereof (e.g., Q0), and LSB compression is performed on the quantized second base value, or a representation thereof (e.g., Q1). In one embodiment, the LSB compression is performed before performing the delta encoding process.

FIG. 7 is a flow diagram depicting a method for performing reverse quantization and delta decoding when decompressing compressed first base and second base values for a tile of an image, in accordance with one embodiment of the invention. This operation is performed when determining a color and/or texture value for a pixel within a tile. A delta value is determined from the decompressed first and second base values. As such, the decompressed base and delta values are combined with a weighted index value for the pixel, as previously defined, to determine the color and/or texture value.

At 710, a tile is identified in an image. More particularly, the tile is associated with one or more pixels. Information related to color and/or texture is determined based on the decompressed base, delta, and index information for a particular pixel of the tile. The image comprises a plurality of tiles, each of which provides color and/or texture data that is displayable by a plurality of pixels for the image. That is, the tile is associated with a decompressed base value, calculated delta value, and a plurality of indices, wherein the indices provide weighting information for pixels in the tile.

At 720, a compressed and quantized first base value and second base value are accessed from a block of memory associated with the tile. The quantized first and second base values are compressed from true color and/or texture values for the image, as previously described in relation to FIG. 6.

At 730, operations are performed that are reversed from the operations performed when compressing the first and second base values. For instance, if delta encoding was optionally performed during compression, then delta decoding is optionally performed on the squeezed, quantized second base value to obtain an unsqueezed quantized second base value.

In another embodiment, delta decoding is always performed, since delta encoding is always attempted. If it was squeezable, such that delta encoding is performed (e.g., on all channels), there is an extra bit of precision gained when encoding. Otherwise, if it was not squeezable, the extra bit is not gained. As such, what is gained is how many bits are saved during the adding operation. For example, if squeezable, q0 is stored at 6 bits, and q1 stored at 4 bits, and two 6 bit values are recovered. On the other hand, if not squeezable, q0 is stored at 5 bits, and q1 is stored at 5 bits, with 1 bit less precision. As such, if squeezed, q0 and q1 are six bits, but if not squeezed, q0 and q1 are 5 bits. Also, in another embodiment, LSB decompression adds a bit, giving either 7 or 6 bits.

For instance, if there are 10 bits of space for the first base value (q0) and the second base value (q1) (where q0 is stored in 5 bits and q1 is stored in 5 bits), the following would be performed if there delta encoding was not performed, where q0' and q1' are returned at 5 bits of precision.

| | |
|---|---|
| qo' = q0 | // 5 bits |
| q1' = (q0 + q1) & 0x1F | // 5 bits |

If we have 10 bits of space for the first base value q0 and the second base value (q1) (where q0 is stored in 6 bits), where delta encoding was performed, the following would be preformed:

| | |
|---|---|
| qo' = q0 | // 6 bits |
| q1' = (q0/* six bits */ + + q1/* four bits */)) & 0x3F | // mask to 6 bits |

Here, q0' and q1' are returned to six bits of precision, and as such there is one more bit of precision gained. As shown, q1' is larger than 10'. This is performed during compression, and as such, performing delta encoding gives an added bit of precision, in one embodiment.

At 740, additional decompression operations are performed. For instance, after any delta decoding operation is performed, reverse quantization is performed on the quantized first and second base values to obtain a reproduced first base value, and a reproduced second base value. At 750, a delta value is determined between the reproduced first and second base values. For instance, the delta value is the difference between the reproduced first and second base values. The reproduced first base value and the delta value are used for purposes of determining color and/or texture values for pixels in the corresponding tile.

In another embodiment, LSB decompression is performed. In particular, LSB decompression is performed on the quantized first base value, or a representation thereof (e.g., Q0), and LSB decompression is performed on the quantized second base value, or a representation thereof (e.g., Q1). In one embodiment, the LSB decompression is performed before performing reverse quantization.

1 bpp Decoding

Figure 8:
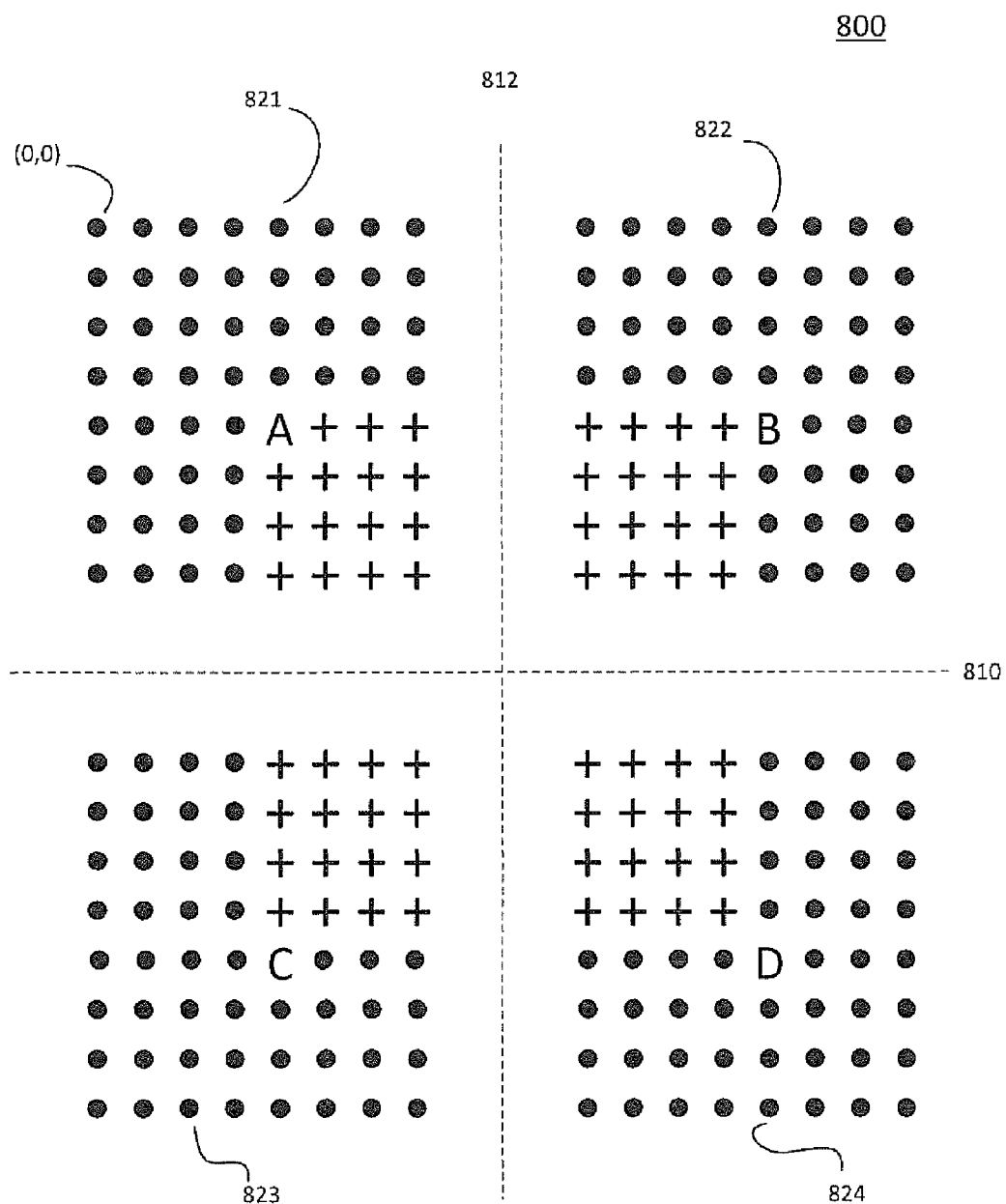
FIG. 8 is an illustration of neighboring blocks selected for base and delta interpolation in a 1 bpp format, in accordance with one embodiment of the invention.

FIG. 8 is an illustration of neighboring tiles in an image 800 selected for base and delta interpolation in a 1 bpp format, in accordance with one embodiment of the invention. As shown, tiles are outlined by lines 810 and 812, and include tiles 821-824. Tile size is 8×8 pixels. For instance, tile 821 includes base (Abase) and delta (Adelta) information at pixel A, tile 822 includes base (Bbase) and delta (Bdelta) information at pixel B, tile 823 includes base (Cbase) and delta (Cdelta) information at pixel C, and tile 8324 includes base (Dbase) and delta (Ddelta) information at pixel D. Pixel (0,0) is located at the upper left by convention.

To decompress pixel (5,5) (at "A",) it is sufficient to decompress and determine the base and delta values associated with tile 821 (e.g., at A) and compute the result using the decompressed index. To decompress the other pixels at +'s, the four bases associated with the tiles 821-824 are bilinearly interpolated (e.g., between the four bases Abase, Bbase, Cbase, and Dbase). Also, the four deltas associated with tiles 821-824 are also bilinearly interpolated (e.g., between Adelta, Bdelta, Cdelta, Ddelta). The interpolated base and the delta values are then weighted using the decompressed and interpolated or averaged index value, as previously described. Base and delta values are determined as previously described.

For A, B, etc., the base values are in the range of 0 to 255, and the delta values are in the range of negative (−) 255 to 255. The delta values are in the range −255 . . . 255 for all red, green, and blue values. The alpha channel is associated with base values in the range of 0 to 16, and delta values in the range −16 to +16.

Assuming that u ranges from 0 at A to 8 at B, and v ranges from 0 at A to 8 at C, the bilinear interpolation function is, as follows:

```
// accumulate over 4 channels (do for i=0 to 3) for both base and
delta values
val[i] = A[i]*(8−u)*(8−v) + B[i]*u*(8−v) + C[i]*(8−u)*v + D[i]*u*v
// then round to u8 or s9 for RGB and u9 or s10 for A.
// Note the shift is signed (if val+round is negative, shift in 1's
at the MSB.)
val[i] = (val[i] + round[i]) >> shift[i]
```

In the above, shift [i]={6, 6, 6, 2} and round [i]={32, 32, 32, 2} for channels {red, green, blue, and alpha}. Note that the base bi-linear interpolation is unsigned whereas the delta interpolation is signed (i.e., val[i] will always be non-negative for bases, whereas it can be negative for deltas).

Given a bilinearly interpolated ibase, idelta, and weight in 0 to 16, the result is computed, as follows:

result[*i*]=(*i*base[*i*]*16+weight**i*delta[*i*]+8)>>4

Finally, result[il is clamped from above only to the range 0 to 255. That is, the clamp is "if (result[i]>255) result[i]=255; result[i] will never be negative.

As shown in FIG. 8, the pixels in the range of (4,4) to (11,11) inclusive are decompressed using first two tiles in the first row and the first two blocks in the second row (e.g., tiles 821-824).

For pixels at the border, if "is_wrapped" is true, to decompress the pixel at (0,0) tiles used for interpolation include the first tile (e.g., the 821) in the first row, the last tile in the first row, the first tile in the last row, and the last tile in the last row (of the compressed image. Otherwise, that pixel is decompressed using only the first block in the first row (repeated four times), in clamp mode.

FIG. 9 is an illustration of a tile 900 showing the pixels used for determining an index value for a pixel (+) in the tile 900 in the one bit for every two pixels (1/2) mode, in accordance with one embodiment of the invention. In 1/2 index mode, the indices that are stored are those for which ((u^v)&1)==0; i.e., the indices at the Xs in tile 900. The upper left "X" is at u=O, v=O; where v goes from 0 to 7 from the top to the bottom and u goes from 0 to 7 from left to right. The index values are interpolated from neighboring X's. For example, the index value at "+" would be computed via (XO+X1++X2+X3+2)/4; i.e., the rounded mean value. This arithmetic is done to 4 bits of precision. Note that adjoining blocks may be in either 1/2 or 2/4 mode, such that, each block has its own mode.

FIG. 10 is an illustration of a tile 1000 showing the pixels used for determining an index value for a pixel in the tile 1000 in the 2 bits for every 4 pixels (2/4) mode, in accordance with one embodiment of the invention. As shown in FIG. 10, the indices are stored for those pixels in which ((u^v)&1)==0. In other words, the representative pixel at "X" provides an index value for the three neighboring pixels, to the east, south, and southeast.

Further, in the 1/2 mode, each index decompresses to a weight of 0 or 16. In the 2/4 mode, each index decompresses to a weight of 0, 5, 11, or 16. Also, in one embodiment, missing weights are interpolated from adjacent weights that came from stored indices, or valid weights.

In one embodiment, the interpolation algorithm is, as follows: a) look at the N, S, W, and E neighbors, as shown in FIG. 11. If any were valid, return their rounded average weight. b) Otherwise, look at the NE, SE, NW, SW neighbors, as shown in FIG. 11, and return the rounded average weight of the valid neighbors. Note that the index interpolation will always have from 1 to 4 valid neighbors.

When "is_wrapped" is false, thereby indicating a clamping condition, index interpolation changes also. Specifically, the indices used to compute the interpolated index never go outside the tile (i.e., not only do the tiles not wrap, the index interpolation is clamped to the edge of the blocks). In other words, if the "NE", "E", "SE", "S", and "SW" indices in FIG. 11 were outside the block, they would be considered not valid, and only the "N" and "W" (or "NW") weights would be used to calculate the interpolated weight at the center pixel 1110. For example, for a 23×23 image, the left and top pixels will be clamped to that edge, but the lower and right pixels will use indices that are inside the block but outside the 23×23 image.

Figure 12:
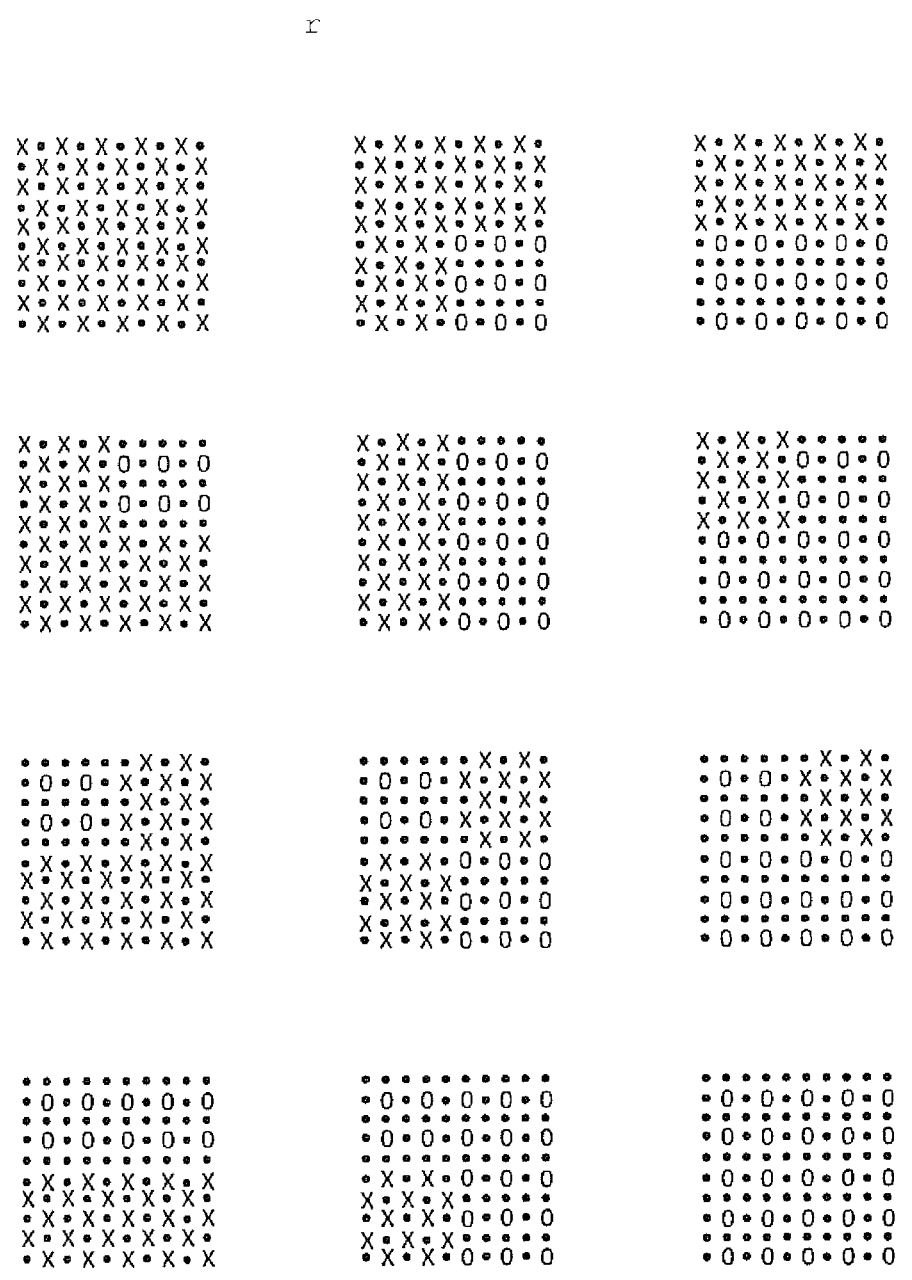

FIG. 12 is a diagram showing all the possible combinations of 1/2 and 2/4 tiles (e.g., with a 1-index border) for a 1 bpp format, in accordance with one embodiment of the invention. Each "." pixel has 1, 2, 3, or 4 nearest neighbors. The value of any "." pixel is dependent on only the valid indices present in its eight nearest neighbors, and further is the interpolated and/or averaged and rounded mean of these indices. The index mode of the tile containing the indices specify which indices are valid.

2 bpp Decoding

Figure 13:
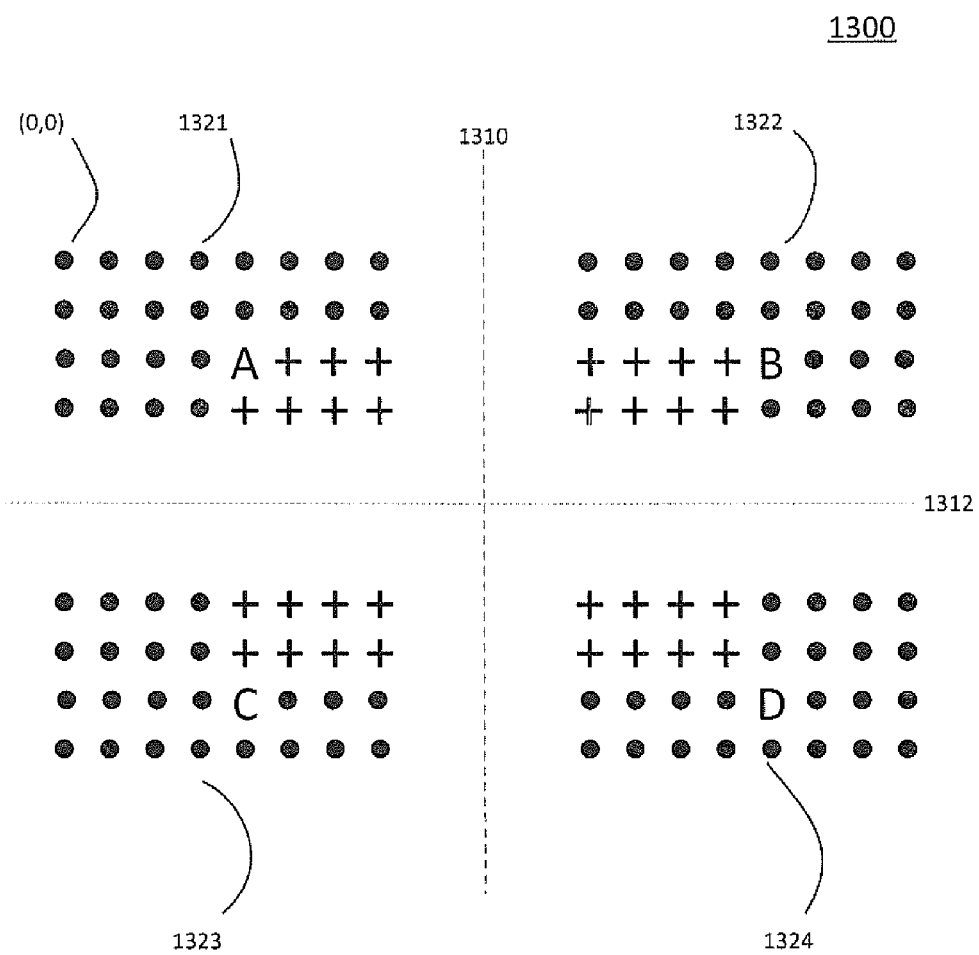
FIG. 13 is an illustration of neighboring tiles in an image 1300 selected for base and delta interpolation in a 2 bpp format, in accordance with one embodiment of the invention.

FIG. 13 is an illustration of neighboring tiles in an image 1300 selected for base and delta interpolation in a 2 bpp format, in accordance with one embodiment of the invention. As shown, tiles are outlined by lines 810 and 812, and include tiles 1321-1324. Tile size is 4×8 pixels. Each tile includes base and delta information. For instance, tile 1321 includes base (Abase) and delta (Adelta) information at pixel A, tile 1322 includes base (Bbase) and delta (Bdelta) information at pixel B, tile 1323 includes base (Cbase) and delta (Cdelta) information at pixel C, and tile 1324 includes base (Dbase) and delta (Ddelta) information at pixel D. Pixel (0,0) is located at the upper left by convention.

To decompress pixel (4,2) (at "A"), it is sufficient to decompress Abase and Adelta and compute the result using the decompressed index. To decompress the other pixels at +'s, you bilinearly interpolate between the four bases Abase, Bbase, Cbase, Dbase, bilinearly interpolate between the four deltas Adelta, Bdelta, Cdelta, Ddelta, and then compute the result using the decompressed index.

For A, B, etc., the base values are in the range 0 to 255 and the delta values in the range negative (−)255 to +255 for all channels, but the alpha channel, which has base values in the range 0 to 15 and delta values in the range negative (−)15 to +15. Assuming that u ranges from 0 at A to 8 at B, and v ranges from 0 at A to 4 at C, the bilinear interpolation function is, as follows:

```
// accumulate over 4 channels (do for i=0 to 3) for both base and
delta values
val[i] = A[i]*(8−u)*(4−v) + B[i]*u*(4−v) + C[i]*(8−u)*v + D[i]*u*v
// then round to u8 or s9 for RGB and u9 or s10 for A.
// Note the shift is signed (if val+round is negative, shift in 1's
at the MSB.)
val[i] = (val[i] + round[i]) >> shift[i]
```

In the above, shift[i]={5,5,5,1} and round[i]={16,16,16,1} for channels {red, green, blue, alpha}. Note that the base bilinear interpolation is unsigned whereas the delta interpolation is signed (that is, val[i] will always be non-negative for bases, whereas it can be negative for deltas).

Given a bilinearly-interpolated ibase, idelta, and weight in 0 to 15, the result is computed by as follows:

$$result[i]=(ibase[i]*16+weight*idelta[i]+8)>>4$$

Finally, result[i] is clamped from above only to the range 0 to 255. That is, the clamp is if (result[i]>255) result[i]=255; result[i] never be negative.

The pixels in the range (4,2) to (11,5) inclusive are decompressed using the first two tiles (1321 and 1322) in the first row and the first two tiles (1323 and 1324) in the second row, as shown in FIG. 13. Also, if "is_wrapped" is true, indicating a wrapped mode, to decompress the pixel at (0,0) tiles required include the first tile (1321) in the first row, the last block in the first row, the first block in the last row, and the last block in the last row (of the compressed image). Otherwise, that pixel is decompressed using only the first tile (1321) tile in the first row (repeated four times) in a clamped mode.

For index decoding, FIG. 14 is an illustration of a tile 1400 showing pixels and their relation to index values in the tile 1400 in the 1 bit for every 1 pixels (1/1) mode, in accordance with one embodiment of the invention. Tile 1400 includes 4×8 pixels. In the 1/1 mode, the indices are stored as 1 bpp, and no interpolation is done.

FIG. 15 is an illustration of a tile 1500 showing the pixels used for determining an index value for a pixel ("+") in the tile 1500 in the 2 bits for every 4 pixels (2/4) mode, in accordance with one embodiment of the invention. As shown in FIG. 15, the indices are stored for those pixels in which ((u^v)&1==0. In other words, the representative pixel at "X" provides an index value for a neighboring pixel, such that for every 4 pixels, there are 2 bits reserved for index values.

As shown in FIG. 15, the upper left "x" pixel is at u=0, v=0, wherein v goes from 0 to 3 from the top to the bottom and u goes from 0 to 7 from left to right. The "."s pixels are interpolated from the four nearest neighboring x's. For example, the value at "+" is computed via (X0+X1+X2+X3+2)/4, or in other words, the rounded mean value. This arithmetic is done to 4 bits of precision. Note that adjoining blocks may be in either 1/1 or 2/2 mode; in either case the corresponding index is extracted.

In 1/1 mode each index decompresses to a weight of 0 or 16. Also, in the 2/2 mode, each stored index decompresses to a weight of 0, 5, 11, or 16. Missing weights are interpolated from adjacent weights that came from stored indices (or previously referred to as "valid weights").

Figure 16:
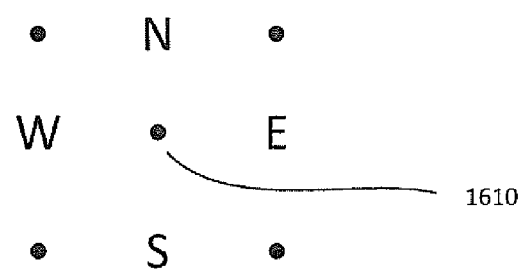
FIG. 16 is a diagram illustrating the eight nearest neighbors of pixels to a particular pixel for purposes of determining an index value for the pixel in a 2 bpp mode, in accordance with one embodiment of the invention.

FIG. 16 is a diagram illustrating the eight nearest neighbors of a group 1600 of pixels to a particular pixel 1610 for purposes of determining an index value for the pixel 1610 in a 2 bpp mode, in accordance with one embodiment of the invention. In particular, in one embodiment, the interpolation algorithm is, as follows: a) look at the N, S, W, and E neighbors, as shown in FIG. 16. If any were valid, return their rounded average weight. Note there will always be at least two. Note that the index interpolation will always have from 2 to 4 valid neighbors. Also, the above method is a subset of the method used for determining index values used for 1 bpp, and as such, the 1 bpp index value determination method can also be used in the 2 bpp mode.

When "is_wrapped" is false, thereby indicating a clamping condition, index interpolation changes also. Specifically, the indices used to compute the interpolated index never go outside the tiles (i.e., not only do the tiles not wrap, the index interpolation is clamped to the edge of the blocks). In other words, if the "E" and "S" indices in FIG. 16 were outside the tile 1600, they would be considered not valid, and only the "N" and "W" weights would be used to calculate the interpolated weight at the center pixel 1610. For example, for a 23×23 image, the left and top pixels will be clamped to that edge, but the lower and right pixels will use indices that are inside the block but outside the 23×23 image.

4 bpp Decoding

Figure 17:
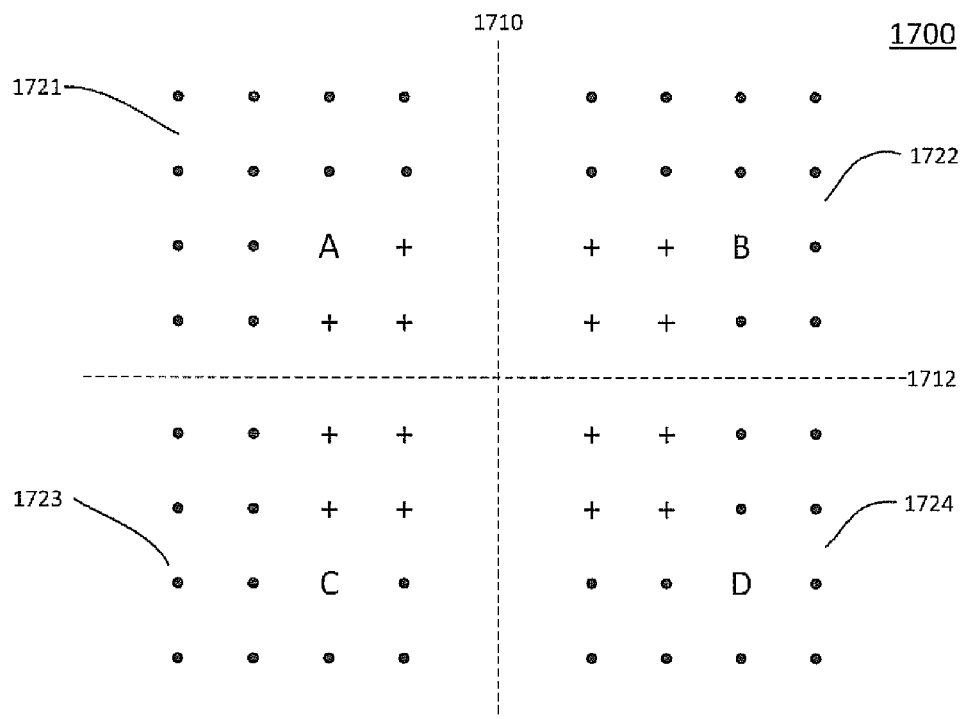
FIG. 17 is an illustration of neighboring tiles in an image selected for base and delta interpolation in a 4 bpp format, in accordance with one embodiment of the invention.

FIG. 17 is an illustration of neighboring tiles in an image 1700 selected for base and delta interpolation in a 4 bpp format, in accordance with one embodiment of the invention. As shown, tiles are outlined by lines 1710 and 1712, and include tiles 1321-1324. Tile size is 4×4 pixels. Each tile includes base and delta information. For instance, tile 1721 includes base (Abase) and delta (Adelta) information at pixel A, tile 1722 includes base (Bbase) and delta (Bdelta) information at pixel B, tile 1723 includes base (Cbase) and delta (Cdelta) information at pixel C, and tile 1724 includes base (Dbase) and delta (Ddelta) information at pixel D. Pixel (0,0) is located at the upper left by convention.

In FIG. 17, to decompress pixel (2,2) (at "A",) it is sufficient to decompress base value (Abase) and delta value (Adelta) and compute the result using the decompressed index. To decompress the other pixels at "+"'s, the four bases associated with each of the tiles 1721-1724 (Abase, Bbase, Cbase, Dbase) are bilinearly interpolated, the four deltas associated with each of the tiles 1721-1724 (Adelta, Bdelta, Cdelta, Ddelta) are bilinearly interpolated, and then the resulting color and/or texture value is computed using the decompressed index, as previously described.

For A, B, etc., the base values are in the range 0 . . . 255 and the delta values in the range negative (−)255 to +255 for all channels (e.g., red, green, and blue) but the alpha channel, which has base values in the range 0 to 16, and delta values in the range of negative (−)16 to +16.

Assuming that u ranges from 0 at A to 4 at B, and v ranges from 0 at A to 4 at C, the bilinear interpolation function is as follows:

```
// accumulate over 4 channels (do for i=0 to 3) for both base and
delta values
val[i] = A[i]*(4−u)*(4−v) + B[i]*u*(4−v) + C[i]*(4−u)*v + D[i]*u*v
// then round to u8 or s9 for RGB and u9 or s10 for A. Note the shift
is signed (if
val+round is negative, shift in 1's at the MSB.)
val[i] = (val[i] + round[i]) >> shift[i]
```

In the above, shift[i]={4, 4, 4, 0} and round[i]={8, 8, 8, 0} for channels {red, green, blue, alpha}. Note that the base bilinear interpolation is unsigned, whereas the delta interpolation is signed. That is, val[i] will always be non-negative for bases, whereas it can be negative for deltas.

Given a bilinearly-interpolated ibase, idelta, and weight in 0 to 16, the result is computed as follows:

```
Bool transp_alpha_value =
    (index_mode == INDEX_2_1_TRANSP_ALPHA &&
                    wt == TRANSP_ALPHA_INDEX)
                    // TRANSP_ALPHA_INDEX is 11
if (index_mode == INDEX_2_1_TRANSP_ALPHA)
    wt = index_remap[wt]        // wt will be 0 5 11 or 16;
    remap that to 0 8 8 16
result[i] = (ibase[i] * 16 + weight + idelta[i] + 8) >> 4
if (transp_alpha_value)
    result[ALPHA] = 0
```

In addition, result[i] is clamped from above only to the range of 0 to 255. That is the clamp is "if (result[i]>255) result[i]=255; result[i] will never be negative.

The pixels in the range (2,2) to (5,5) inclusive are decompressed using the first two tiles (1721 and 1722) in the first row and the first two tiles (1723 and 1724) in the second row, as shown in FIG. 17. Also, if "is_wrapped" is true, indicating a wrapped mode, to decompress the pixel at (0,0) tiles required include the first tile (1721) in the first row, the last block in the first row, the first block in the last row, and the last block in the last row (of the compressed image). Otherwise, that pixel is decompressed using only the first tile (1721) tile in the first row (repeated four times) in a clamped mode.

Figure 18:
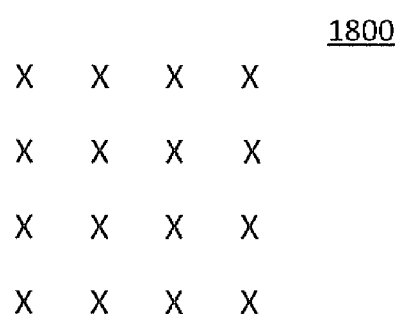
FIG. 18 is an illustration of a tile showing pixels and their relation to index values in the tile in the 4 bpp mode, in accordance with one embodiment of the present disclosure.

The 4 bpp mode does not interpolate indices. For index decoding, FIG. 18 is an illustration of a tile 1800 showing pixels and their relation to index values in the tile 1800 in the 4 bpp mode, in accordance with one embodiment of the present disclosure. That is there are always 2 bits per pixels, which are mapped to weights 0, 5, 11, and 16, respectively. These weights are changed to 0, 8, 8, and 16 for tiles for which transparent alpha is active.

FIG. 19 is an illustration of the code used for implementing reverse quantization processes for determining reproduced base, delta, and index values for a pixel, in accordance with one embodiment of the present disclosure.

Thus, according to embodiments of the present disclosure, systems and methods are described in which compression and decompression of base, delta, and index values are performed to store and display color and/or texture information for a pixel in an image. Embodiments of the present invention include the decompression of pixel information that is performed in a wrapped or clamped mode for pixels at the borders of an image. Other embodiments of the present invention include compression and decompression of pixel and tile information that are performed for images of arbitrary size, and not just powers of two sizes. Still other embodiments of the present invention provide for LSB compression and decompression of base and delta values for a tile of an image.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the present disclosure are thus described. While the present disclosure has been described in particular embodiments, it should be appreciated that the disclosure should not be construed as limited by such embodiments, but rather construed according to the below claims.

The invention claimed is:

1. In a codec, a method for image rendering, comprising:
   identifying a tile in an image, wherein said image comprises a plurality of tiles including color data that is displayed by a plurality of pixels;
   determining a first base value and a second base value associated with said tile;

quantizing said first base value and said second base value to obtain a quantized first base value and a quantized second base value;
performing delta encoding on said quantized second base value in relation to said quantized first base value to obtain a squeezed, quantized second base value;
indicating whether or not delta encoding was performed; and
storing said quantized first base value and said squeezed, quantized second base value in a block of memory.

2. The method of claim 1, further comprising:
performing least significant bit compression on said quantized first base value and said quantized second base value.

3. The method of claim 2, further comprising:
performing least significant bit compression before said performing delta encoding.

4. The method of claim 1, further comprising:
accessing said stored quantized first base value and said squeezed, quantized second base value in said block;
performing delta decoding on said squeezed, quantized second base value to obtain an unsqueezed quantized second base value;
performing reverse quantization on said quantized first base and said unsqueezed quantized second base value to obtain a reproduced first base value, and a reproduced second base value corresponding to said tile for purposes of determining color values for corresponding pixels.

5. The method of claim 4, further comprising:
determining a delta value between said reproduced first base value and said reproduced second base value, wherein said first base value and said delta value are used for purposes of determining color values for corresponding pixels in said tile.

6. The method of claim 1, further comprising:
setting an alpha value for one of base values or delta values of blocks in said image to a constant, and wherein said base values and said delta values comprise red, green and blue values in said blocks of said image.

7. The method of claim 1, wherein said base value and said delta value comprise red, green and blue values, and an alpha value that is less than a quantized maximum alpha value.

8. A non-transitory computer-readable medium having computer-executable instructions performing a method for image rendering, comprising:
identifying a tile in an image, wherein said image comprises a plurality of tiles including color data that is displayed by a plurality of pixels;
determining a first base value and a second base value associated with said tile;
quantizing said first base value and said second base value to obtain a quantized first base value and a quantized second base value;
performing delta encoding on said quantized second base value in relation to said quantized first base value to obtain a squeezed, quantized second base value; and
storing said quantized first base value and said squeezed, quantized second base value in a block of memory.

9. The computer-readable medium of claim 8, wherein said method further comprises:
performing least significant bit compression on said quantized first base value.

10. The computer-readable medium of claim 8, wherein said method further comprises:
performing least significant bit compression on said quantized second base value.

11. The computer-readable medium of claim 10, wherein said method further comprises:
performing said least significant bit compression operation before said performing said delta encoding operation.

12. The computer-readable medium of claim 8, wherein said method further comprises:
accessing said stored quantized first base value and said squeezed, quantized second base value in said block;
performing delta decoding on said squeezed, quantized second base value to obtain an unsqueezed quantized second base value;
performing reverse quantization on said quantized first base and said unsqueezed, quantized second base value to obtain a reproduced first base value, and a reproduced second base value corresponding to said tile for purposes of determining color values for corresponding pixels.

* * * * *